United States Patent
Finley et al.

(10) Patent No.: US 12,099,116 B2
(45) Date of Patent: Sep. 24, 2024

(54) HYBRID ICE DETECTION USING AIRBORNE WEATHER RADAR

(71) Applicant: Rockwell Collins, Inc., Cedar Rapids, IA (US)

(72) Inventors: Jeffery A. Finley, Cedar Rapids, IA (US); Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 527 days.

(21) Appl. No.: 17/516,980

(22) Filed: Nov. 2, 2021

(65) Prior Publication Data

US 2023/0133643 A1 May 4, 2023

(51) Int. Cl.
  G01S 13/95 (2006.01)
  G06N 3/08 (2023.01)

(52) U.S. Cl.
  CPC .............. G01S 13/953 (2013.01); G06N 3/08 (2013.01)

(58) Field of Classification Search
  CPC .................... G01S 13/95–13/958; G06N 3/08
  See application file for complete search history.

(56) References Cited

U.S. PATENT DOCUMENTS

| | | | | |
|---|---|---|---|---|
| 6,377,207 B1* | 4/2002 | Solheim | ................... | G01W 1/02 342/26 B |
| 6,741,203 B1* | 5/2004 | Woodell | ................... | G01S 7/285 342/26 B |
| 9,019,146 B1* | 4/2015 | Finley | ................... | G06T 11/001 342/182 |
| 9,846,230 B1 | 12/2017 | Finley et al. | | |
| 9,869,766 B1* | 1/2018 | Breiholz | ............... | G01S 13/106 |
| 10,494,108 B1* | 12/2019 | Finley | ................... | B64D 43/00 |
| 10,877,150 B2 | 12/2020 | Badin et al. | | |
| 11,787,547 B2* | 10/2023 | Wang | ................... | G08G 5/0013 340/962 |
| 2006/0036366 A1* | 2/2006 | Kelly | .................... | G08B 27/006 702/3 |
| 2013/0234884 A1* | 9/2013 | Bunch | ................... | G01S 13/953 342/26 B |
| 2014/0176362 A1* | 6/2014 | Sneed | ..................... | G01S 13/95 342/26 R |
| 2016/0274271 A1 | 9/2016 | Lukas et al. | | |
| 2017/0276785 A1* | 9/2017 | Sneed | ..................... | G01S 13/95 |
| 2018/0149745 A1* | 5/2018 | Christianson | .......... | G01S 7/062 |
| 2018/0356518 A1 | 12/2018 | Bunch et al. | | |
| 2020/0090322 A1* | 3/2020 | Seo | ........................ | G06N 3/084 |

(Continued)

OTHER PUBLICATIONS

Extended European Search Report dated Mar. 3, 2023 in European Patent Application No. 22205051.0.

(Continued)

*Primary Examiner* — Peter M Bythrow
(74) *Attorney, Agent, or Firm* — Suiter Swantz IP

(57) ABSTRACT

A radar system identifies the presence of moderate intensity icing based on a single pulse reflectivity versus ice water content relationship. The radar then identifies convective cores in proximity to the aircraft and records features of those convective cores. Convection information, including storm tops, temperature, and cell topology, is used to indicate the presence of severe icing. A trained neural network may relate the various data to make a high intensity icing determination.

20 Claims, 2 Drawing Sheets

(56) References Cited

U.S. PATENT DOCUMENTS

2021/0080569 A1* 3/2021 Farney .................. G01S 13/951
2022/0041166 A1* 2/2022 Tiwari .................... G06N 3/04
2022/0267014 A1* 8/2022 Wang ................... G08G 5/0021

OTHER PUBLICATIONS

Strapp, J.W., et al.; "DOT/FAA/TC-14/31 The High Ice Water Content Study of Deep Convective Clouds: Report on Science and Technical Plan", Jun. 30, 2016, pp. 1-105.

* cited by examiner

HYBRID ICE DETECTION USING AIRBORNE WEATHER RADAR

BACKGROUND

High altitude ice crystals are a threat to aircraft engines and pitot systems. Differentiation of ice crystals and ice crystal concentrations is very difficult. Currently, radar manufacturers must indicate two levels of high-altitude icing—moderate and high. Radars cannot accurately distinguish between these two levels of icing solely based on detected reflectivity.

Ground based radars differentiate ice crystals using dual polarimetric methods but multi-polarimetric radars are too heavy and expensive to field on commercial aircraft.

SUMMARY

In one aspect, embodiments of the inventive concepts disclosed herein are directed to a radar system that identifies the presence of moderate intensity icing based on a single pulse reflectivity versus ice water content relationship. The radar then identifies convective cores in proximity to the aircraft and records features of those convective cores. Convection information is used to indicate the presence of severe icing.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
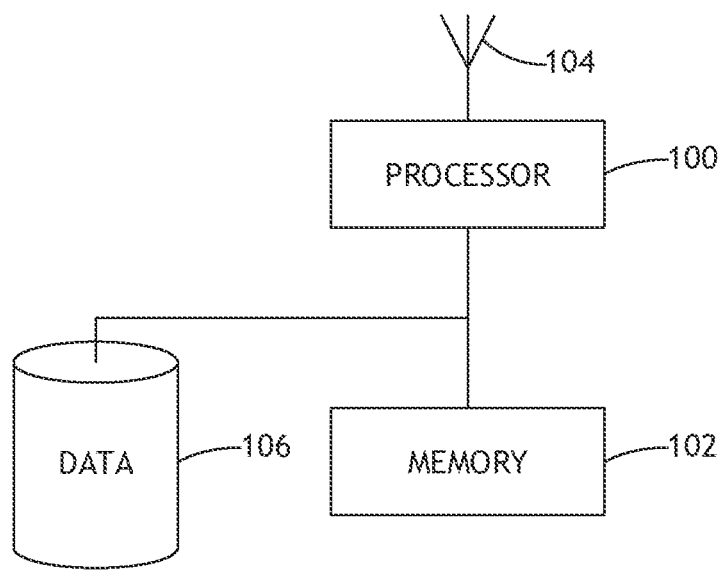
FIG. 1 shows a block diagram of a system useful for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system that identifies the presence of moderate intensity icing based on a single pulse reflectivity versus ice water content relationship. The radar then identifies convective cores in proximity to the aircraft and records features of those convective cores. Convection information is used to indicate the presence of severe icing.

Referring to FIG. 1, a block diagram of a system useful for implementing an exemplary embodiment is shown. The system includes a processor 100, memory 102 connected to the processor 100 for embodying processor executable code, and an antenna 104 connected to the processor 100 for producing pulses and receiving return pulses according to a radar system.

The processor 100 electronically configures the antenna 104 to perform scans at multiple elevations (at least two). In at least one embodiment, the antenna 104 comprises an electronically scanned array (ESA); an ESA may be configured to perform multiple disparate scans simultaneously. Elevation angles depend on aircraft altitude and the static air temperature measured by the aircraft. The return signals received from each elevation scan are sampled and stored in a data storage device 106 connected to the processor 100. The processor 100 and antenna 104 may transmit a single pulse or a series of pulses. These pulses can be unmodulated pulses or have some form of amplitude or phase modulation. For each pixel sampled, the processor 100 computes the raw power of the return signal and performs a log operation on the raw power to convert it to decibels (dB). The power in dB is then filtered to reduce noise and unwanted echoes.

In at least one embodiment, processor 100 computes a reflectivity for each sampled pixel based on the filtered power in dB. A log operation is performed on computed reflectivity (Z) which results in a parameter with units dBZ:

$$Z = f(\text{power}_{dB})$$

$$dBZ = 10 * \log_{10}(Z)$$

The processor 100 then computes an estimate to moderate ice water content based on this calculated dBZ. In at least one embodiment, the dBZ to ice water content relationship may be given by:

$$\text{ice water content} = A^{B*dBZ^C + D}$$

where the ice water content is in grams per cubic meter; and the values of A, B, C and D depend on several factors including the static air temperature, aircraft altitude, etc.

Figure 2:
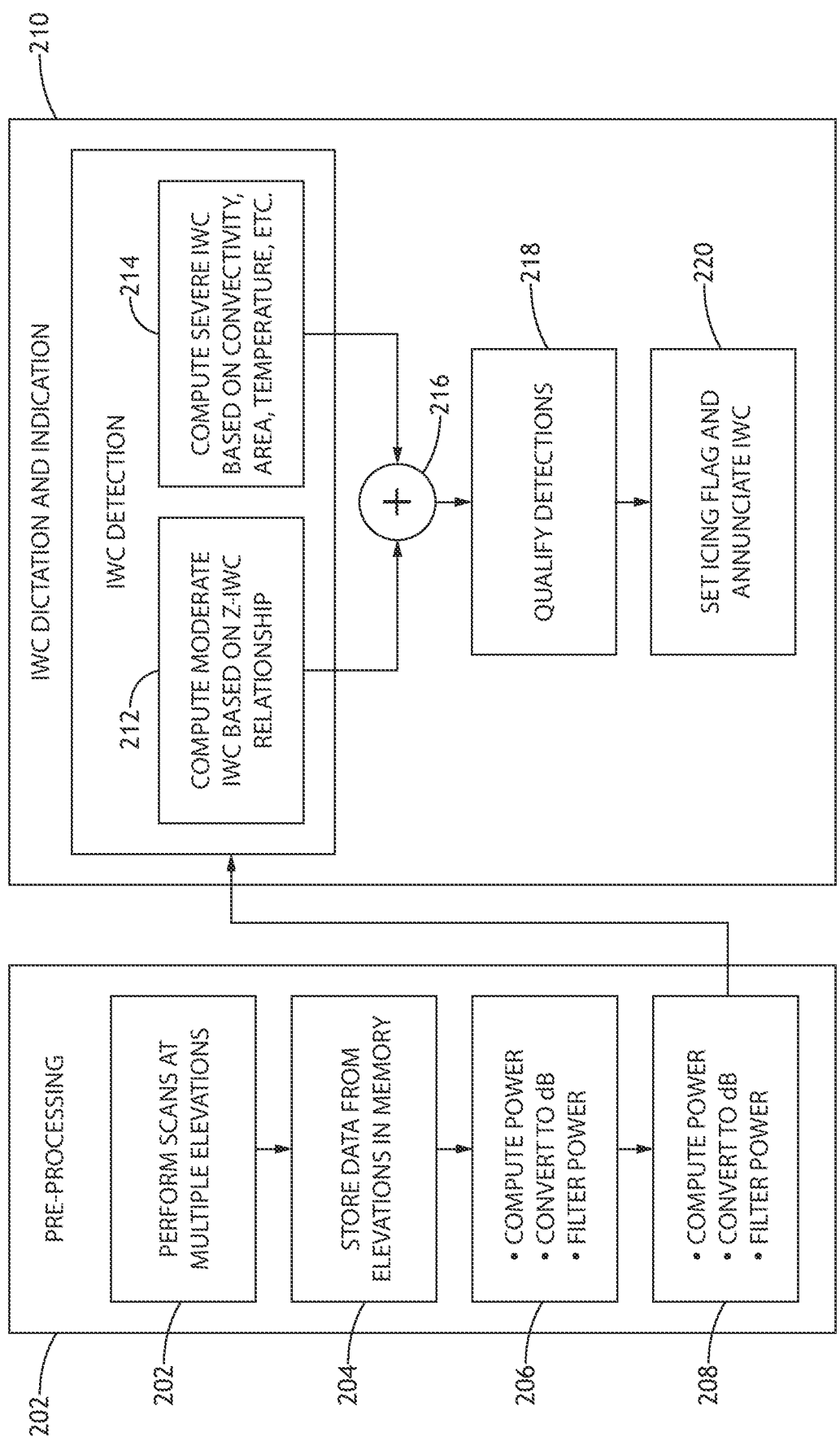
FIG. 2 shows a block flowchart of a method for identifying high intensity icing according to an exemplary embodiment.

Referring to FIG. 2, a block flowchart of a method for identifying high intensity icing according to an exemplary embodiment is shown. In a pre-processing phase 200, a radar system and processor perform 202 scans at multiple elevations, and potentially at multiple angles; return data from each scan is stored 204, associated with the corresponding elevation and angle. In at least one embodiment, where the system antenna comprises an ESA, the antenna may be electronically configured to perform 202 scans at multiple angles simultaneously. The processor performs 206, 208 one or more raw power computation, conversion, and filtrations steps to convert the raw power return data into power in dB and to reduce noise and remove echoes.

During a detection phase 210, the processor utilizes the filtered and converted power data in dB to determine 212 if moderate icing conditions exist. Such determination may be made via a relationship between ice water content and reflectivity as a function of return pulse power in dB. The processor also identifies 214 convective cells, and various features of those cells including size, temperature, convectivity, etc. The radar system may use parameters such as the presence of large areas (for example, area greater than 500 sq. km) of moderate reflectivity (20-30 dBz) at a certain altitude (for example, 8 km) to indicate the presence of severe ice water content.

The processor then combines 216 the determined 212 probability of moderate icing with the identified 214 features of proximal convective cells to determine a probability of severe or high intensity icing. Such determination may be based on relationships between the features of the convective cells and some threshold probability or certainty of moderate icing, some number of exceeded thresholds for the set of identified features, a function defined by the each of the identified features, etc. Alternatively, or in addition, a trained neural network may receive the moderate icing probability and convective cell features, and determine via a trained set of network layers if threshold metrics are exceeded.

All the pixels with ice water content detections are further qualified 218 for reasonableness. The pixels that have a lower power residual are flagged as valid ice water content and are then indicated appropriately. A crew warning flag may be set 220 for all regions or pixels where a threshold is exceeded.

In one exemplary embodiment, for each pixel sampled, the radar computes the high ice water content by first computing a convective index. This convective index can be computed based on reflectivity, probability of lightning, probability of hail, vertically integrated liquid, etc. There is a known relationship between convective cores of thunderstorms and a very high probability of high ice water content; therefore, pixels that have a high convective index value may be flagged as having high ice water content. These pixels are qualified 218 for confirmation.

In another exemplary embodiment, the radar computes the probability of high ice water content by computing the area of moderate reflectivity at a given altitude. For example, there is a correlation (R greater than 0.7) between ice water content of more than two grams per cubic meter and large areas (area greater than 500 sq. km) of 20-30 dBz at 8-10 km altitude.

Embodiments of the present disclosure provide a mechanism for ice detection functions without requiring expensive dual polarization radar antenna. The method uses existing radar modes combined with standard reflectivity measurements to provide ice crystal concentration differentiation with high probability of detection and low probability of false alert. Existing algorithms evaluate the degree of convectivity of a weather cell and assign "high" level of ice crystals to those convective regions. Single beam reflectivity returns with no temporal comparison to assign "moderate" levels of ice crystal concentration.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
    at least one processor in data communication with a radar antenna and a memory storing processor executable code for configuring the at least one processor to:
        determine a water content per unit area in one or more regions;
        identify a convective cell via the radar antenna;
        determine a probability of moderate icing in the one or more regions;
        determine a probability of severe icing in the one or more regions based on a proximity of each of the one or more regions to the convective cell; and
        produce a crew warning when the probability of icing exceeds a threshold.

2. The computer apparatus of claim 1, wherein:
    the at least one processor is further configured to identify a plurality of features of the convective cell, including at least a level of convectivity; and
    determining the probability of severe icing is further based on the plurality of features.

3. The computer apparatus of claim 2, wherein the plurality of features further comprises a convective cell temperature, a convective cell topology, and a convective cell elevation.

4. The computer apparatus of claim 1, wherein the at least one processor is further configured to:

segregate and record one or more radar return pulses according to a corresponding elevation; and convert a raw power of each of the one or more radar return pulses to return power in decibels.

5. The computer apparatus of claim 4, wherein the at least one processor is further configured to filter each return power in decibels to remove noise and other undesirable echoes.

6. The computer apparatus of claim 5, wherein determining the probability of moderate icing comprises:

converting each return power in decibels to reflectivity; and converting reflectivity to dBz.

7. The computer apparatus of claim 1, wherein determining the probability of severe comprises instantiating a trained neural network to receive parameters of the probability of moderate icing and one or more features of the convective cell.

8. A method comprising:

determining a water content per unit area in one or more regions;

identifying a convective cell via a radar system;

determining a probability of moderate icing in the one or more regions;

determining a probability of severe icing in the one or more regions based on a proximity of each of the one or more regions to the convective cell; and producing a crew warning when the probability of icing exceeds a threshold.

9. The method of claim 8, further comprising identify a plurality of features of the convective cell, including at least a level of convectivity, wherein determining the probability of severe icing is further based on the plurality of features.

10. The method of claim 9, wherein the plurality of features further comprises a convective cell temperature, a convective cell topology, and a convective cell elevation.

11. The method of claim 8, further comprising:

segregating and recording a plurality of radar return pulses according to a corresponding elevation; and converting a raw power of each of the plurality of radar return pulses to return power in decibels.

12. The method of claim 11, further comprising filtering each return power in decibels to remove noise and other undesirable echoes.

13. The method of claim 12, wherein determining the probability of moderate icing comprises:

converting each return power in decibels to reflectivity; and converting reflectivity to dBz.

14. A radar system comprising:

a radar antenna; and at least one processor in data communication with the radar antenna and a memory storing processor executable code for configuring the at least one processor to:

determine a water content per unit area in one or more regions;

identify a convective cell via the radar antenna;

determine a probability of moderate icing in the one or more regions;

determine a probability of severe icing in the one or more regions based on a proximity of each of the one or more regions to the convective cell; and produce a crew warning when the probability of icing exceeds a threshold.

15. The radar system of claim 14, wherein:

the at least one processor is further configured to identify a plurality of features of the convective cell, including at least a level of convectivity; and determining the probability of severe icing is further based on the plurality of features.

16. The radar system of claim 15, wherein the plurality of features further comprises a convective cell temperature, a convective cell topology, and a convective cell elevation.

17. The radar system of claim 14, wherein the at least one processor is further configured to:

segregate and record one or more radar return pulses according to a corresponding elevation; and convert a raw power of each of the one or more radar return pulses to return power in decibels.

18. The radar system of claim 17, wherein the at least one processor is further configured to filter each return power in decibels to remove noise and undesirable echoes.

19. The radar system of claim 18, wherein determining the probability of moderate icing comprises:

converting each return power in decibels to reflectivity; and converting reflectivity to dBz.

20. The radar system of claim 14, wherein determining the probability of severe comprises instantiating a trained neural network to receive one or more features of the convective cell.

* * * * *